the salt-forming reaction may be con-# UNITED STATES PATENT OFFICE 2,676,173

PENICILLIN SALTS OF OXYBENZYL-ISOBUTYL AMINES

Rudolf Hiltmann, Ernst Auhagen, and Klaus Bauer, Wuppertal-Elberfeld, Germany, assignors to Schenley Industries, Inc., New York, N. Y., a corporation of Delaware No Drawing. Application February 16, 1952, Serial No. 271,983

Claims priority, application Germany February 20, 1951

11 Claims. (Cl. 260—239.1)

This invention relates generally to chemotherapeutic agents and, more particularly, it is concerned with novel salts of penicillin having properties especially suiting them for use in chemotherapy where high blood levels of parenterally administered penicillin are necessary or desirable.

The term penicillin, in accordance with common usage, designates herein both the acidic, salt-forming antibiotic agent which may be obtained from fermentation operations according to known procedures, and also the substances of which this antibiotic agent is comprised, a mixture of individually identifiable compounds, some of which have been designated penicillin F, G, X, O, K, etc. Penicillin, as a mixture and also its components individually have been widely utilized in chemotherapy in the form of their alkali metal or alkaline earth metal salts, particularly the potassium or sodium salts. These salts may be produced by treating highly purified forms of penicillin with a suitable alkali metal or alkaline earth metal reagent, whereby the corresponding alkali metal or alkaline earth metal salt of penicillin is produced by a simple metathetical reaction. The salt-forming reaction may be conducted in an aqueous medium, from which the product salt may be recovered by vacuum dehydration at room or elevated temperatures or while in frozen state. These salts are well crystallized and thus may be obtained in a high degree of purity. They are readily soluble in water or isotonic saline solutions, which facilitates the preparation of solutions for parenteral administration.

However, these alkali metal and alkaline earth metal salts of penicillin have certain disadvantages, for instance, they are costly to produce if vacuum dehydration of the frozen solution is a step in the process of manufacture, and they are relatively unstable when in solution, losing their activity unless stored under refrigeration. Furthermore, when simple aqueous solutions of these salts are injected intramuscularly, the initially high, therapeutically effective, penicillin blood levels which may be produced are maintained but briefly. Because the antibiotic is rapidly removed from the situs of injection, and excreted, often repeated injections of fresh material are required to maintain therapeutically effective concentrations of the penicillin, which is both troublesome to the patient and wasteful of the antibiotic. It was found that somewhat more satisfactory retention of the antibiotic in the vicinity of the situs of administration could be obtained by using oil suspensions of the penicillin alkali metal or alkaline earth metal salts, but even under these conditions, the excretion of the antibiotic was found to be unsatisfactorily rapid and the necessary high penicillin blood levels could be maintained only by frequently repeated injections.

Investigations were undertaken to develop more satisfactory forms of penicillin and, in the course of these investigations, it was found that if concentrated aqueous solutions of highly purified forms of penicillin or its alkali metal salts are treated with procaine base or a procaine salt, the procaine salt of penicillin may be obtained as a crystalline precipitate. It was found, also, that the procaine salt of penicillin, obtained in this manner, is a relatively stable compound that is merely sparingly soluble in water and in body fluids. These properties suggested its chemotherapeutic usefulness in instances where it might be desirable that a slowly dissolving form of penicillin be placed near the situs of infection to maintain substantially constant high therapeutically effective levels of the antibiotic in this locality. It was found, when a highly purified procaine salt of penicillin was administered in this manner, as an aqueous suspension or, preferably, as a suspension in a gelled vegetable oil such as gelled sesame oil, high penicillin blood levels could be maintained for a substantial period, in some instances as long as 96 hours following administration of a single injection containing 300,000 I. U. of the medicament in oil gelled with addition of about 2% of aluminum stearate.

However, although the procaine salt of penicillin was found to be more satisfactory as a therapeutic form of the antibiotic than were the simple alkali salts of penicillin, nevertheless experience indicated that the procaine salt was not to be regarded as being necessarily the ultimately desirable form of the antibiotic, for it is appreciably soluble in water and body fluids, even though its solubility is small, thus making it necessary to repeat the administration of the drug. Another disadvantage of the procaine salt of penicillin, primarily of importance from the drug manufacturer's viewpoint, is that unless highly purified starting materials are used and certain solvents are employed as reaction media when making the salt, a non-crystalline, oily or tarry mass may be obtained. A need has been felt, therefore, for a new, therapeutically useful, non-toxic form of penicillin, which would be no more, and preferably less, soluble than procaine penicillin, and which could be obtained readily in a pure, crystalline state without need for the use of highly purified starting materials. It is an object of this invention to provide a novel penicillin product that satisfies this need.

Although it is well known that penicillin is capable of forming ammonium type salts when treated with various nitrogenous organic bases, these penicillin salts, generally, are so readily soluble in water that the salts can be obtained in a crystalline form only with extreme difficulty. In accordance with this invention, it is found that certain nitrogenous organic bases form penicillin salts which not only are non-toxic, have the therapeutical usefulness of the procaine salt of penicillin, and may be easily obtained as substantially pure crystals, but which, surprisingly, are even less soluble in water than is procaine penicillin.

These certain nitrogenous bases are isobutyl-benzyl amines nuclearly substituted, in the meta or para positions, by an alkoxy group of at most four carbon atoms or a phenoxy or benzyloxy group. These bases may be represented by the formula:

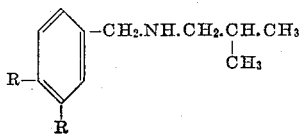

wherein one R is hydrogen and the other R is a substituent of the group consisting of lower alkoxy having at most four carbon atoms, phenoxy and benzyloxy.

These novel penicillin salts may be obtained by a metathetical reaction, performed in water or in commonly available organic solvent reaction media, involving an aqueous solution of an alkali metal salt of penicillin with an aqueous solution of a common acid salt of the selected organic base, or, alternatively, these new salts may be obtained by treatment of a solution of penicillin itself in a non-polar organic solvent such as ether, with a solution of the selected free organic base in a non-polar organic solvent. In each instance, the reaction proceeds smoothly and the product is obtained as a pure crystalline mass, which precipitates from the reaction medium and may be removed by filtration or other common procedures. The insolubility of the product penicillin salts is such that the crystalline salt precipitate forms even when aqueous reaction media are used in the salt-forming reaction.

As mentioned above, the novel organic base penicillin salts of this invention may be prepared by reacting penicillin itself with the selected organic base of the type above specified, or by reacting a salt of penicillin with a salt of the base. These salts may be obtained by treatment of the ordinary penicillin of commerce, which is a mixture of the various forms of penicillin, or the individual penicillins may be used as such. Of the various commonly known forms of penicillin, penicillin G (benzyl penicillin), is especially preferred, not merely because of the excellent therapeutic properties of organic base salts of this form of penicillin, but additionally because penicillin G forms very sparingly soluble salts with the mentioned type of organic bases. Any of the common alkali metal salts of penicillin in any of its forms may be used in preparing the products of this invention, although the sodium and potassium salts, because of their ready availability, are preferred. Any of the common acid salts of the group of organic bases above defined may be utilized, although here, too, salts from the commonly available salt-forming acids, such as acetic acid or the simple mineral acids, for example, hydrochloric or sulfuric acid, are preferred. Any of the common non-polar organic solvents in which penicillin and the organic bases are soluble may be used as reaction media when producing the new products utilizing penicillin and the free organic bases as starting materials.

The organic bases used in the production of the novel products of this invention have local anaesthetic properties similar to procaine but are of somewhat more lasting effect. They may be easily prepared by condensing a suitably substituted benzaldehyde with isobutylamine to form a correspondingly substituted N-isobutyl-benzalimine, then reducing these condensation products, either by electrolytic processes or by use of sodium amalgam in a polar medium, to produce the desired final products. The nuclearly substituted benzaldehyde starting material may be prepared by reacting meta or para hydroxy benzaldehyde, depending upon whether a 3- or a 4-position substituted product is desired, with a halogen compound of the desired substituent group, for instance, an alkyl or benzyl chloride, bromide or iodide.

The penicillin organic base salts of this invention may be administered for therapeutic purposes in an aqueous or oily vehicles. If so desired, the oily vehicles may include such well known resorption-retarding additives as beeswax or other waxes, or a gelling agent such as aluminum monostearate may be incorporated in the compositions.

To facilitate an understanding of how the novel penicillin salts of this invention may be prepared, certain specific examples herewith follow, illustrating both the use of aqueous reaction media and non-polar organic solvent media in the salt-forming reaction. It is to be understood clearly, however, that these examples are supplied by way of illustration merely, and are not to be construed as imposing any limitations upon this invention.

*Example 1*

About 3.56 g. of the sodium salt of penicillin G is dissolved in water, the solution is acidulated with dilute phosphoric acid and extracted with ether. After drying the ether extract with sodium sulfate, it is mixed with an ethereal solution of 2.35 g. of 3-n-butyloxy-N-isobutyl-benzylamine. After some time, the 3-n-butyloxy-N-isobutyl-benzylamine salt of penicillin G crystallizes in radially arranged needles, which are filtered off under vacuum and washed with a small amount of dry ether. The yield of the product is 4.18 g.; it has a melting point of 76–78° C. and an activity of 990 international penicillin units per milligram. It is optically active, having a specific rotation, measured at 20° C. in a 5% solution in chloroform and at the D line of sodium, of +111.4°.

The 3-n-butyloxy-N-isobutyl-benzylamine may be obtained by condensing 3-n-butyloxy-benzaldehyde (B. P.$_3$=120° C.) with isobutylamine, then catalytically hydrogenating the azomethine compound so obtained. Under 2.5 mm. pressure, the free base boils at 136–138° C.; its hydrochloride melts at 124–126° C.

*Example 2*

Approximately 2.72 g. of 3-n-butyloxy-N-isobutyl-benzylamine hydrochloride is dissolved in 150 cc. of water and then mixed, dropwise, with a solution of 3.56 g. of the sodium salt of penicillin G in 15 cc. of water, while stirring. The penicillin G organic base salt precipitates as colorless crystalline precipitate, which is filtered off under suction and washed with about 75 cc. of water. The yield of the product salt is about 4.70 g.; its melting point: 76–78° C.; its potency: about 990 international penicillin units per milligram; and its specific rotation:

$$[\alpha]_D^{20°\,C.} = +111.4°$$

*Example 3*

About 2.21 g. of 3-(n-propoxy)-N-isobutyl-benzylamine is dissolved in 20 cc. of ether and mixed with a dry ethereal solution of 3.34 g. of penicillin G. Crystallization sets in and the precipitated 3-(n-propoxy)-N-isobutylbenzylamine salt of penicillin G is filtered off by suction, washed with a small amount of ether, and dried. This product has a melting point of 72° C. and a potency of 1050 I. U. per mg.

The 3-(n-propoxy)-N-isobutyl-benzyl-amine starting material may be obtained by condensing 3-(n-propoxy)-benzaldehyde (boiling point $_{3mm.}$=110–115° C.) with isobutylamine and catalytically hydrogenating the resultant azomethine compound. The free base has a boiling point, at 3 mm. pressure, of 133–134° C. and its hydrochloride melts at 103–105° C. The 3-(n-propoxy)-benzaldehyde may be prepared by reacting 3-hydroxy-benzaldehyde with n-propylbromide.

*Example 4*

Approximately 2.56 g. of 3-(n-propoxy-N-isobutyl-benzylamine hydrochloride is dissolved in a minimum quantity of water and this solution is mixed with a solution of 3.56 g. of the sodium salt of penicillin G in 15 cc. of water. Crystallization of the product salt begins after a short period. The precipitated 3-(n-propoxy)-N-isobutyl-benzylamine salt of penicillin G is filtered off by vacuum, washed with a small quantity of water, and dried. Its melting point is 72° C. and its potency is 1050 I. U. per mg.

*Example 5*

Approximately 2.21 g. of 3-isopropoxy-N-isobutyl-benzylamine is dissolved in 20 cc. of ether and mixed with a dry ethereal solution of 3.34 g. of penicillin. Crystallization results and the precipitated 3-isopropoxy-N-isobutyl-benzyl-amine salt of penicillin G is filtered off by vacuum, washed with a little ether, and dried. The salt melts at 73° C. and has a potency of 1050 I. U. per mg.

The 3-isopropoxy-N-isobutyl-benzylamine may be obtained by condensation of 3-isopropoxy-benzaldehyde (boiling point $_{11mm.}$=112–115° C.) with isobutylamine and catalytic hydrogenation of the resultant azomethine compound. The boiling point of the free base is 115–116° C. at 2.5 mm. pressure. The 3-isopropoxy-benzaldehyde may be obtained by reacting m-hydroxybenzaldehyde with isopropylbromide.

*Example 6*

About 2.35 g. of 3-isobutoxy-N-isobutyl-benzylamine is dissolved in 20 cc. of ether and mixed with a dry ethereal solution of 3.34 g. of penicillin G. Crystallization and precipitation of the 3-isobutoxy-N-isobutyl-benzylamine salt of penicillin G results and the product is filtered off by vacuum, washed with a small quantity of ether, and dried. Its melting point is 56° C. and its potency is 1040 I. U. per mg.

The 3-isobutoxy-N-isobutyl-benzylamine may be obtained by condensation of 3-isobutoxy-benzaldehyde (boiling point $_{11mm.}$=126–131° C.) with isobutylamine and catalytic hydrogenation of the resultant azomethine compound. The free base has a boiling point, at 2.5 mm. pressure, of 129–130° C. The 3-isobutoxy-benzaldehyde may be obtained by reacting m-hydroxybenzaldehyde with isobutylbromide.

*Example 7*

About 2.35 g. of 4-(n-butoxy)-N-isobutyl-benzylamine is dissolved in 20 cc. of ether and mixed with a dry ethereal solution of 3.34 g. of penicillin G. Crystallization and precipitation of the 4-(n-butoxy)-N-isobutyl-benzylamine salt of penicillin G occurs and it is filtered off by suction, washed with ether, and dried. The salt has a melting point of 67° C. and its potency is 1040 I. U. per mg.

The 4-(n-butoxy)-N-isobutyl-benzylamine starting material may be obtained by condensation of 4-(n-butoxy)-benzaldehyde (boiling point $_{3mm.}$=135–136° C.) with isobutylamine and catalytic hydrogenation of the resultant azomethine compound. The free base has a boiling point of 155–157° C. at 6 mm. pressure, and its hydrochloride melts at 183–184.5° C. The 4-(n-butoxy)-benzaldehyde may be prepared by reacting p-hydroxybenzaldehyde with n-butylbromide.

*Example 8*

Approximately 2.70 g. of 4-(n-butoxy)-N-isobutyl-benzylamine hydrochloride is dissolved in a minimum quantity of water and then mixed with a solution of 3.56 g. of the sodium salt of penicillin G in 15 cc. of water. Crystallization occurs and the precipitated 4-(n-butoxy)-N-isobutyl-benzylamine salt of penicillin G is filtered off by vacuum, washed with a little water, and dried. The salt melts at 67° C. and has a potency of 1040 I. U. per mg.

*Example 9*

About 2.69 g. of 3-benzyloxy-N-isobutyl-benzylamine is dissolved in 20 cc. of ether and mixed with a dry ethereal solution of 3.34 g. of penicillin G. Crystallization sets in. The precipitated 3-benzyloxy-N-isobutyl-benzylamine salt of penicillin G is filtered off by vacuum, washed with ether, and dried. The salt has a melting point of 58° C. and a potency of 980 I. U. per mg.

The 3-benzyloxy-N-isobutyl-benzylamine starting material may be obtained by condensation of 3-benzyloxy-benzaldehyde (boiling point $_{3mm.}$=172–175° C.) with isobutylamine and catalytic hydrogenation of the resultant azomethine compound. The free base has a boiling point of 181° C. (at 3 mm. pressure) and its hydrochloride melts at 154–155° C. The 3-benzyloxy-benzaldehyde may be obtained by reacting m-hydroxybenzaldehyde with benzalbromide.

*Example 10*

Approximately 2.55 g. of 4-phenoxy-N-isobutyl-benzylamine is dissolved in 20 cc. of ether and mixed with a dry ethereal solution of 3.34 g. of penicillin G. Crystallization results and the precipitated 4-phenoxy-N-isobutyl-benzylamine salt of penicillin G is filtered off by vacuum, washed with ether, and dried. The salt melts at 111° C. and has a potency of 1000 I. U. per mg.

The 4-phenoxy-N-isobutyl-benzylamine starting material may be obtained by condensation of 4-phenoxy-benzaldehyde with isobutylamine and catalytic hydrogenation of the resultant azomethine compound. The free base has a boiling point, at 3 mm. pressure, of 169–171° C. and its hydrochloride melts at 193.5–195° C. The 4-phenoxy-benzaldehyde may be obtained by reacting p-hydroxy-benzaldehyde with monochlorobenzene.

It will be obvious to those versed in the field to which this invention relates that, at choice, the salts of any of the several penicillins individually or mixed salts of mixtures of the several penicillins, may be prepared as above described, the product obtained in each instance being dependent upon and corresponding to the penicillin starting material utilized.

Having thus described the subject matter of this invention, what it is desired to secure by Letters Patent is:

1. As a new chemotherapeutic agent, a substantially pure, crystalline organic base salt of penicillin wherein the organic base moiety is a substance represented by the formula:

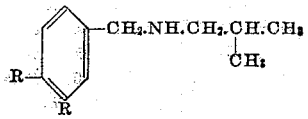

wherein one R is hydrogen and the other is a substituent chosen from the group consisting of alkoxy radicals of at most four carbon atoms, phenoxy and benzyloxy.

2. As a new chemotherapeutic agent, a substantially pure, crystalline 3-(n-butoxy)-N-isobutyl-benzylamine salt of penicillin.

3. As a new chemotherapeutic agent, the substantially pure, crystalline 3-(n-butoxy)-N-isobutyl-benzylamine salt of penicillin G.

4. As a new chemotherapeutic agent, a substantially pure, crystalline 3-(n-propoxy)-N-isobutyl-benzylamine salt of penicillin.

5. As a new chemotherapeutic agent, the substantially pure, crystalline 3-(n-propoxy)-N-isobutyl-benzylamine salt of penicillin G.

6. As a new chemotherapeutic agent, a substantially pure, crystalline 3-isopropoxy-N-isobutyl-benzylamine salt of penicillin.

7. As a new chemotherapeutic agent, the substantially pure, crystalline 3-isopropoxy-N-isobutyl-benzylamine salt of penicillin G.

8. As a new chemotherapeutic agent, a substantially pure, crystalline 3-isobutoxy-N-isobutyl-benzylamine salt of penicillin.

9. As a new chemotherapeutic agent, the substantially pure, crystalline 3-isobutoxy-N-isobutyl-benzylamine salt of penicillin G.

10. As a new chemotherapeutic agent, a substantially pure, crystalline 4-n-butoxy-N-isobutyl-benzylamine salt of penicillin.

11. As a new chemotherapeutic agent, the substantially pure, crystalline 4-n-butoxy-N-isobutyl-benzylamine salt of penicillin G.

References Cited in the file of this patent

UNITED STATES PATENTS

| Number | Name | Date |
|---|---|---|
| 2,515,898 | Rhodehamel | July 18, 1950 |
| 2,547,640 | Goldman | Apr. 3, 1951 |
| 2,578,537 | Granatek | Dec. 11, 1951 |
| 2,585,432 | Buckwalter | Feb. 12, 1952 |

OTHER REFERENCES

Ballaro: "Ciencia e Investigacion," vol. 4 (1948), pp. 481 and 482.